Figure 2:
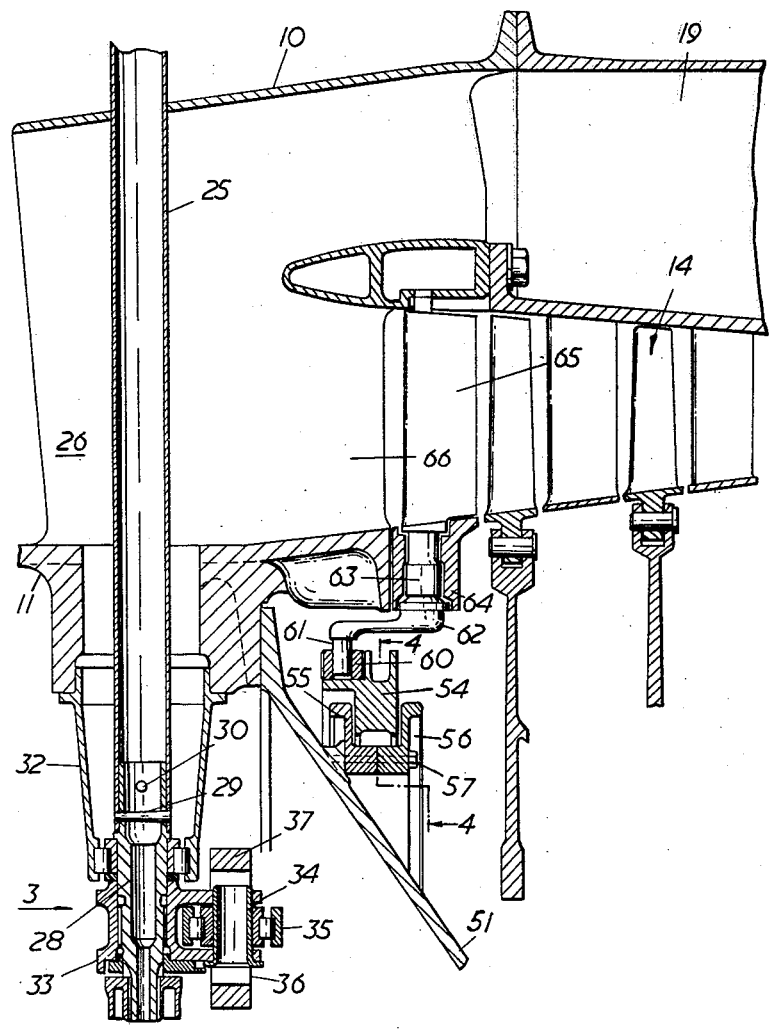

Oct. 22, 1963 G. A. K. POPE ETAL 3,107,690
GAS TURBINE ENGINE HAVING ADJUSTABLE GUIDE VANES
Filed April 21, 1960 3 Sheets-Sheet 1
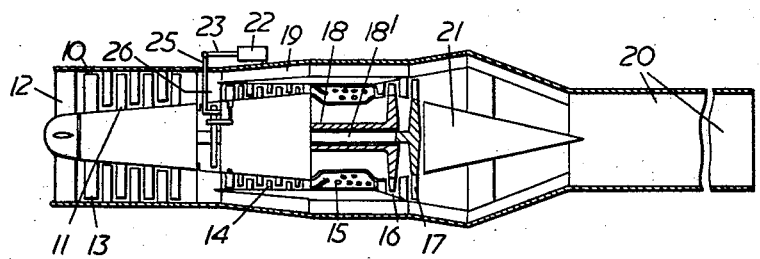
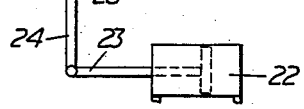
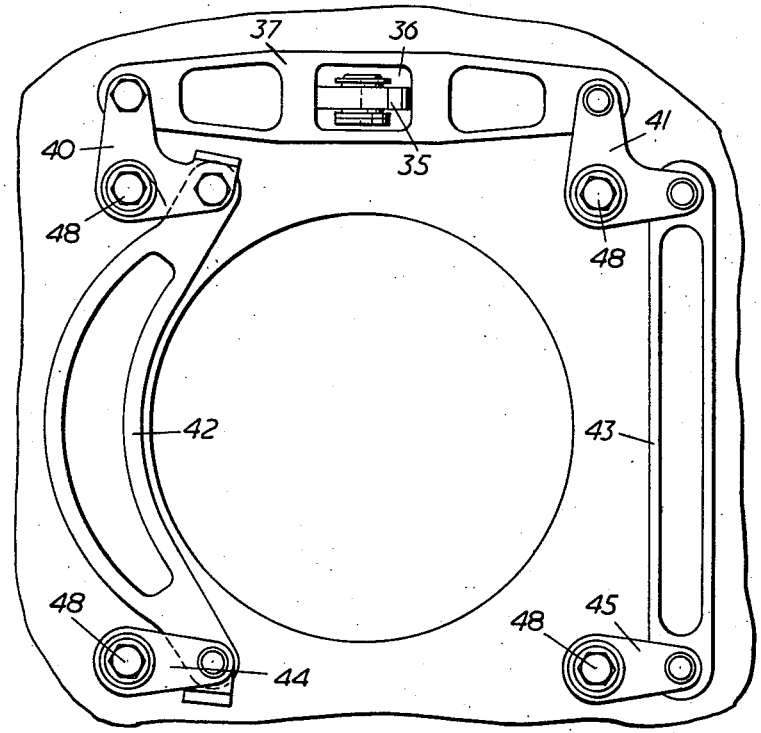
Inventors
GEOFFREY ALAN KENNETH POPE
EDWARD REGINALD BREALEY
NELSON HECTOR KENT
By
Cushman, Darby & Cushman
Attorneys Oct. 22, 1963   G. A. K. POPE ETAL   3,107,690
GAS TURBINE ENGINE HAVING ADJUSTABLE GUIDE VANES
Filed April 21, 1960   3 Sheets-Sheet 2

Inventors
GEOFFREY ALAN KENNETH POPE
EDWARD REGINALD BREALEY
NELSON HECTOR KENT
By
Cushman, Darby & Cushman
Attorneys

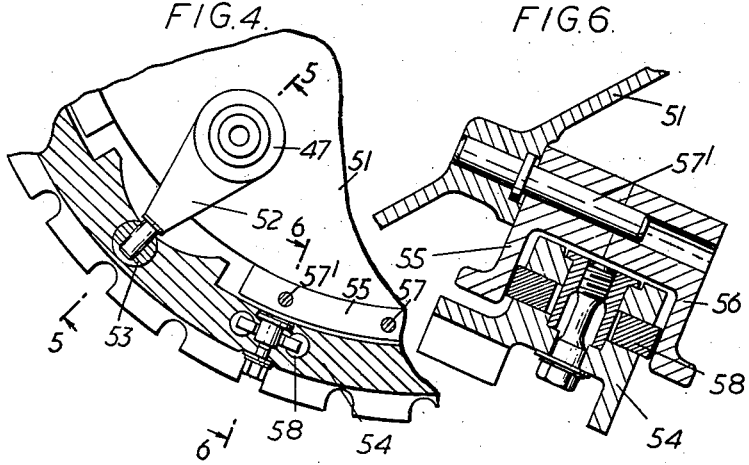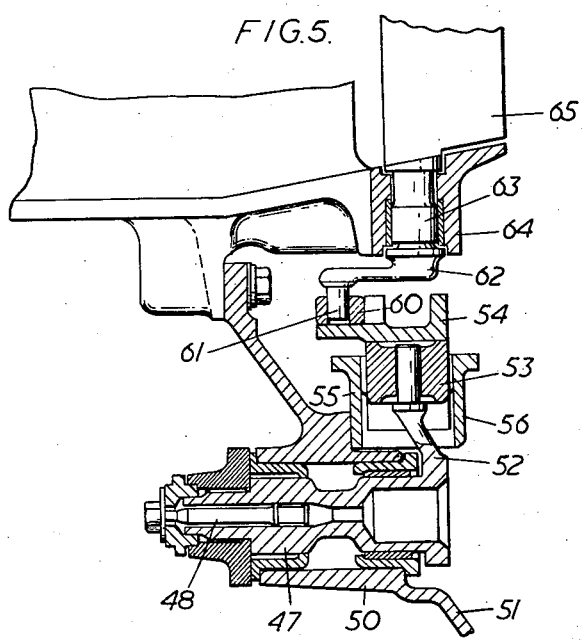

United States Patent Office 3,107,690
Patented Oct. 22, 1963

3,107,690
GAS TURBINE ENGINE HAVING ADJUSTABLE GUIDE VANES
Geoffrey Alan Kenneth Pope, Chaddesden, Derby, and Edward Reginald Brealey and Nelson H. Kent, Derby, England, assignors to Rolls-Royce Limited, Derby, England, a company of Great Britain
Filed Apr. 21, 1960, Ser. No. 23,803
Claims priority, application Great Britain Apr. 30, 1959
3 Claims. (Cl. 137—601)

This invention concerns improvements in or relating to gas turbine engines.

According to the present invention a gas turbine engine comprises a compressor or a turbine provided with pivotally mounted guide vanes, a vane operating device disposed inwardly of the guide vanes, movement of the said device effecting pivotal movement of the guide vanes, means disposed externally of the engine for effecting movement of the vane operating device, and a linkage which is spaced from said vanes and which connects the external means with the vane operating device, said linkage being arranged to cause no obstruction, or substantially no obstruction, to fluid flow through the engine.

Preferably the gas turbine engine is of the by-pass type in which a portion of the air compressed by a compressor of the engine is passed into a by-pass duct which is disposed around, so as to by-pass, the combustion equipment and turbine of the engine, the said linkage causing no obstruction, or substantially no obstruction, to compressed air flow through the by-pass duct. Thus the gas turbine engine may be provided with a low pressure and a high pressure compressor, the by-pass duct being supplied with compressed air from the low pressure compressor and the said guide vanes being inlet guide vanes of the high pressure compressor.

Preferably a portion of said linkage passes through a hollow, vane-shaped, strut which extends across the main annular fluid duct of the engine. Thus, in the case of the said by-pass engine, the strut may be disposed immediately upstream of the inlet end of the by-pass duct. By this means obstruction of the main annular fluid duct of the engine (and also of the by-pass duct in the case of a by-pass engine) may readily be avoided, since such vane shaped struts must in any case be provided between the engine casing and the inner wall of the engine.

The vane operating device may comprise a rotatably mounted operating ring to which the vanes are connected by cranks, the axis of the ring being coincident with that of the engine. Thus the said linkage portion may be a rotatably mounted shaft, rotation of which effects rotation of the vane operating ring.

The shaft may be arranged to effect rotation of the vane operating ring by being connected to a plurality of members which are themselves connected to the ring at a plurality of angularly spaced apart points. Thus each of said members may be rotatably mounted and may have a radially extending portion engaging the vane operating ring.

Means are preferably provided for preventing axial movement of the ring during rotation thereof.

The invention is illustrated, merely by way of example, in the accompanying drawings, in which:

FIGURE 1 is a diagrammatic sectional elevation of a gas turbine, jet-reaction engine for an aircraft, embodying the present invention, FIGURE 1a is a diagrammatic plan view of a part of the engine shown in FIGURE 1, FIGURE 2 is a section showing a detail of FIGURE 1, FIGURES 3 and 4 are broken away views looking respectively in the direction of the arrows 3 and 4 of FIGURE 2, and FIGURES 5 and 6 are sections taken respectively on the lines 5—5, 6—6 of FIGURE 4.

In FIGURE 1 there is shown a gas turbine, jet reaction engine for use in propelling an aircraft, the engine being of the bypass type. The engine comprises an engine casing 10 between which and an inner wall 11 there is formed the main annular fluid duct 12 of the engine. Gases flowing through the duct 12 pass successively through a low pressure compressor 13, a high pressure compressor 14, combustion equipment 15, and high and low pressure turbines 16, 17 respectively. The high pressure turbine 16 drives the high pressure compressor 14 through a shaft 18, whilst the low pressure turbine 17 drives the low pressure compressor 13 through a shaft 18' which is concentric with and mounted within the shaft 18.

The upstream, or inlet, end of an annular bypass duct 19 communicates with a space between the low and high pressure compressors so as to derive a supply of compressed air from the low pressure compressor 13. The compressed air flowing through the by-pass duct 19 bypasses the high pressure compressor 14, the combustion equipment 15, and the high and low pressure turbines 16, 17 and is discharged into the jet pipe 20 of the engine so as to mix therein with the turbine exhaust gases adjacent the downstream end of a conical diffuser member 21.

Mounted externally of the engine on the engine casing 10 is a hydraulically or pneumatically operated ram 22 (FIGURES 1 and 1a) to whose piston rod 23 there is pivotally connected a link 24. The link 24 is mounted at the outer end of a rotatably mounted tubular operating shaft 25. The shaft 25 extends radially of the engine and passes through a hollow vane-shaped strut 26, the vane 26 serving to space the outer casing 10 from the inner wall 11.

The inner end of the operating shaft 25 has mounted within it an extension portion 28 (FIGURE 2) which is secured to the shaft 25 by pins 29, 30. The extension portion 28 is rotatably mounted in a tubular member 32 which is carried by the inner wall 11.

The extension portion 28 has splined onto it an axially extending lever arm 33 which carries a radially extending stub shaft 34. Rotatably mounted on the stub shaft 34 is a roller 35 which is mounted in a slot 36 provided in a link 37 (see FIGURE 3). The link 37 extends transversely of the engine, the roller 35 engaging transversely spaced walls of the slot 36.

Pivoted to opposite ends of the link 37 are bell crank levers 40, 41 respectively (FIGURE 3). The ends of the bell crank levers 40, 41 remote from the link 37 are pivotally connected to links 42, 43 respectively which in turn are respectively pivoted to levers 44, 45.

Each of the levers 40, 41, 44, 45, is splined onto a rod 47 (FIGURE 5) and is secured thereto by a bolt 48. Each of the rods 47 is rotatably mounted within a tubular bearing portion 50 of a fixed wall structure 51.

Each of the rods 47 extends axially of the engine and at its downstream end is provided with a radially extending arm 52. The outer end of each arm 52 is engaged in a bushing 53. The bushings 53 are mounted in a vane operating ring 54 whose axis is coincident with that of the engine. The bushings 53 are spaced from each other by 90° intervals around the vane operating ring 54.

The vane operating ring 54 is mounted in a channel member constituted by annular wall members 55, 56. The annular wall members 55, 56 are connected to the fixed wall structure 51 by bolts 57 (FIGURE 2) and pins 57' (FIGURE 6). The operating ring 54 is provided with a plurality of rollers 58 (FIGURE 6) which engage the annular wall members 55, 56 so as to prevent axial displacement of the vane operating ring 54 during rotation of the latter.

Mounted on the outer periphery of the vane operating ring 54 are a plurality of bushings 60 which are spaced from each other by equal angular intervals. Journalled in each of the bushings 60 is a pin 61 which forms part of a cranked lever 62. The lever 62 has a radially extending portion 63 which is journalled in a part 64 of the inner wall 11 of the engine. The portions 63 are respectively connected to inlet guide vanes 65 of the high pressure compressor 14.

When it is desired to rotate the inlet guide vanes 65 about their pivotal axes, the ram 22 is operated so as to effect rotation of the operating shaft 25 by way of the rod 23 and link 24. This effects pivotal movement of the lever arm 33 and hence transverse movement of the link 37 in the direction of its own length. Such movement of the link 37 effects rotation of the bell crank levers 40, 41 about their pivot axes, similar rotation of the levers 44, 45 being effected by way of the links 42, 43.

Such rotation of the levers 40, 41, 44, 45 causes rotation of the four rods 47 and hence pivotal movement of the arms 52. Accordingly the vane operating ring 54 is rotated, whereby to cause pivotal movement of the inlet guide vanes 65 by way of the cranked levers 62.

It will be appreciated that since a strut, such as the strut 26, must of necessity be provided to space the casing 10 from the inner wall 11 and since the operating shaft passes through the hollow interior of this strut, pivotal movement of the inlet guide vanes 65 is effected by a mechanism which does not obstruct the gas flow either through the by-pass duct 19 or through the main annular fluid duct 12 of the engine.

We claim:

1. A vane actuating mechanism for use in a gas turbine engine of the type having a plurality of pivotally adjustable, angularly spaced, radially extending guide vanes supported in an annular gas duct between coaxial inner and outer casings of the engine comprising: a plurality of rods extending within the inner casing on axes parallel to each other and to the axis of the duct, said rods being uniformly angularly spaced about the axis of the duct, each of said rods being mounted for rotation about its axis and having a radially extending crank arm portion, means operatively interconnecting said rods for causing rotation of the same in synchronism, a vane operating ring disposed within said inner casing and extending transversely of the axis of said duct, a plurality of bushings corresponding in number to the number of said rods, each of said bushings being pivotally mounted in said vane operating ring about axes parallel to the axis of the duct and at uniformly angularly spaced intervals, said radially extending crank arm portion of each of said rods having sliding engagement with a respective one of said bushings on a radial axis of the respective bushing whereby said vane operating ring is supported by said bushings on said radially extending crank arm portions for rotation about a fixed axis coincident with the axis of the duct, said radial crank arm portions imparting rotary motion to said vane operating ring when said rods are rotated, and said vane operating ring being operatively connected to the guide vanes and effecting pivoting movement to the same when rotated.

2. A vane actuating mechanism for use in gas turbine engines of the type having a plurality of pivotally adjustable, angularly spaced, radially extending guide vanes supported in an annular gas duct between coaxial inner and outer casings of the engine comprising: a plurality of rods extending within the inner casing on axes parallel to each other and to the axis of the duct, said rods being uniformly angularly spaced about the axis of the duct, each of said rods being mounted for rotation about its axis and carrying a radially extending crank arm portion and an additional crank arm, a plurality of links extending within said inner casing transversely of the duct, each of said links being pivotally connected at its ends to an adjacent pair of said additional crank arms, said links interconnecting all of said rods for causing rotation of the same in synchronism, a vane operating ring disposed within said inner casing and extending transversely of the axis of said duct, a plurality of bushings corresponding in number to the number of said rods, each of said bushings being pivotally mounted in said vane operating ring about axes parallel to the axis of the duct and at uniformly angularly spaced intervals, said radially extending crank arm portion of each of said rods having sliding engagement with a respective one of said bushings on a radial axis of the respective bushing whereby the vane operating ring is supported by said bushings on said radially extending crank arm portions for rotation about a fixed axis coincident with the axis of the duct, said radial crank arm portions imparting rotary motion to said vane operating ring when said rods are rotated, said vane operating ring being operatively connected to the guide vanes and effecting pivoting movement to the same when rotated, and means for moving one of said links whereby said rods are rotated simultaneously and transmit rotary motion to said vane operating ring.

3. A vane actuating mechanism as claimed in claim 2 in which said last-mentioned means includes a rotatable operating shaft extending across the duct, said operating shaft having an arm thereon operatively engaging one of said links for moving the same transversely.

References Cited in the file of this patent
UNITED STATES PATENTS

| | | |
|---|---|---|
| 2,271,587 | Haynes | Feb. 3, 1942 |
| 2,337,861 | Adamtchik | Dec. 28, 1943 |
| 2,672,726 | Wolf et al. | Mar. 23, 1954 |
| 2,715,814 | Barr | Aug. 23, 1955 |
| 2,803,943 | Rainbow | Aug. 27, 1957 |
| 2,870,956 | Dhonau et al. | Jan. 27, 1959 |
| 2,909,034 | Jandasek | Oct. 20, 1959 |
| 2,933,236 | Mathieson | Apr. 19, 1960 |

FOREIGN PATENTS

| | | |
|---|---|---|
| 243,957 | Switzerland | Feb. 17, 1947 |
| 1,159,986 | France | Feb. 24, 1958 |